(12) United States Patent  (10) Patent No.: US 8,164,583 B2
Hatakeyama  (45) Date of Patent: Apr. 24, 2012

(54) DISPLAY DEVICE

(75) Inventor: Atsushi Hatakeyama, Osaka (JP)

(73) Assignee: Panasonic Corporation, Osaka (JP)

( * ) Notice: Subject to any disclaimer, the term of this patent is extended or adjusted under 35 U.S.C. 154(b) by 577 days.

(21) Appl. No.: 12/401,652

(22) Filed: Mar. 11, 2009

(65) Prior Publication Data

US 2009/0231297 A1 Sep. 17, 2009

(30) Foreign Application Priority Data

Mar. 13, 2008 (JP) ................... 2008-063664

(51) Int. Cl.
G06F 3/033 (2006.01)

(52) U.S. Cl. ......... 345/179; 349/65; 349/161; 362/97.3; 362/612; 178/18.01

(58) Field of Classification Search .................. None
See application file for complete search history.

(56) References Cited

U.S. PATENT DOCUMENTS 7,002,644 B2 * 2/2006 You et al. ................. 349/58
2008/0024694 A1 * 1/2008 Kondo et al. ............. 349/58

FOREIGN PATENT DOCUMENTS

| JP | 2002-229022 A | 8/2002 |
| JP | 2003-076287 A | 3/2003 |
| JP | 2005-332681 A | 12/2005 |
| JP | 2007-250197 A | 9/2007 |
| JP | 2007-287692 A | 11/2007 |

* cited by examiner

Primary Examiner — Wayne Young
Assistant Examiner — Brian Butcher
(74) Attorney, Agent, or Firm — RatnerPrestia

(57) ABSTRACT

The display device has an LCD panel, a light source, and a digitizer disposed on the back surface of the LCD panel. The display device further contains a U-shaped first heat-dissipation plate made of a non-magnetic material. The first heat-dissipation plate is disposed on at least one end of the periphery of the LCD panel in a way that the opening of the U-shape faces toward the LCD panel. The light source is mounted on the first heat-dissipation plate, and an end section of the digitizer is covered with the opening of the plate.

8 Claims, 4 Drawing Sheets

DISPLAY DEVICE

FIELD OF THE INVENTION

The present invention relates to a display device having a backlight source, and specifically relates to a display device having an electromagnetic digitizer.

BACKGROUND ART

In recent years, a display device with a liquid crystal display (LCD) panel has become the mainstream for display devices. In such an LCD device, a thin film transistor (TFT) is formed on a glass substrate, and a backlight source is disposed on the rear side of an LCD panel in which liquid crystal elements are arranged. The backlight source emits light and the light goes through the panel, so that an image is shown on the display of the device. To obtain clear and bright images with high quality, the backlight source has to provide light with high brightness and uniformity on the display.

Conventionally, a cold-cathode tube has been used as a backlight source for a display device having an LCD panel. However, recent technical advances in light emitting diode (LED)s have drastically increased brightness and operating efficiency and catch up with the level almost equivalent to the cold-cathode tube. With the improvement as a backdrop, LEDs are becoming popular as a backlight source for a small-size LCD device.

However, a cold-cathode tube linearly emits light; on the other hand, an LED emits light in a dot shape when LEDs are used for a backlight source. Therefore, to achieve sufficient brightness as high as that of the cold-cathode tube, the structure of the light source has to be chosen from the two: using a backlight source having a plurality of low-output LEDs; or using a backlight source of a high-output LED with efficiently controlled light dispersion.

In terms of the cost and weight of products, the number of LEDs used for the light source has to be reduced as possible. On the other hand, decreasing the number of LEDs arises the need for increasing brightness of each LED, i.e., increasing input of each LED. This accordingly increases the temperature of the LED and the periphery of the LED. The increase in temperature can deteriorate reliability and operating life of not only the LED but also peripheral components.

To address the problem caused by heat, suggestions have been made in the following patent documents:
Japanese Unexamined Patent Application Publication No. 2002-229022; and,
Japanese Unexamined Patent Application Publication No. 2003-076287.

Focused on heat dissipation from LEDs, these suggestions introduce a structure where a metallic thin-film and a metallic frame, or a soft metallic sheet and a metallic frame are disposed so that the heat generated from LEDs is led to the metallic conductor having a broad area and dissipated from the surface thereof.

Besides, there has been a growing trend in recent years that a touch panel and a digitizer are mounted on data processing devices having the display device above. Serving as a man-machine interface, the touch panel and the digitizer add a function of detecting a position on the screen of the LCD panel. In the structure above, however, a problem arises. The digitizer, which is disposed on the back surface of the LCD panel, detects a position on the screen according to the movement of an electromagnetic pen operated on the front surface of the panel. When a metal including a heat-dissipation plate is disposed within the valid display area, the metal inconveniently affects the magnetic field between the digitizer and the pen, so that an accurate detection of an input position cannot be expected.

SUMMARY OF THE INVENTION

The present invention addresses the problems above. It is therefore an object of the invention to provide a long-life and highly bright display device. The display device attains a reliable data-input to the digitizer, and at the same time, provides sufficient radiation of heat generated from the LEDs.

The display device has an LCD panel, a light source, and a digitizer disposed on the back surface of the LCD panel. The display device further includes a U-shaped first heat-dissipation plate made of a non-magnetic material. The first heat-dissipation plate with an opening is disposed on at least one end of the periphery of the LCD panel in a way that the opening faces toward the LCD panel. The light source is mounted on the first heat-dissipation plate, and an end section of the digitizer is covered with the opening of the plate.

DETAILED DESCRIPTION OF THE INVENTION

The exemplary embodiments of the present invention are described hereinafter with reference to the accompanying drawings.

First Embodiment

Figure 1:
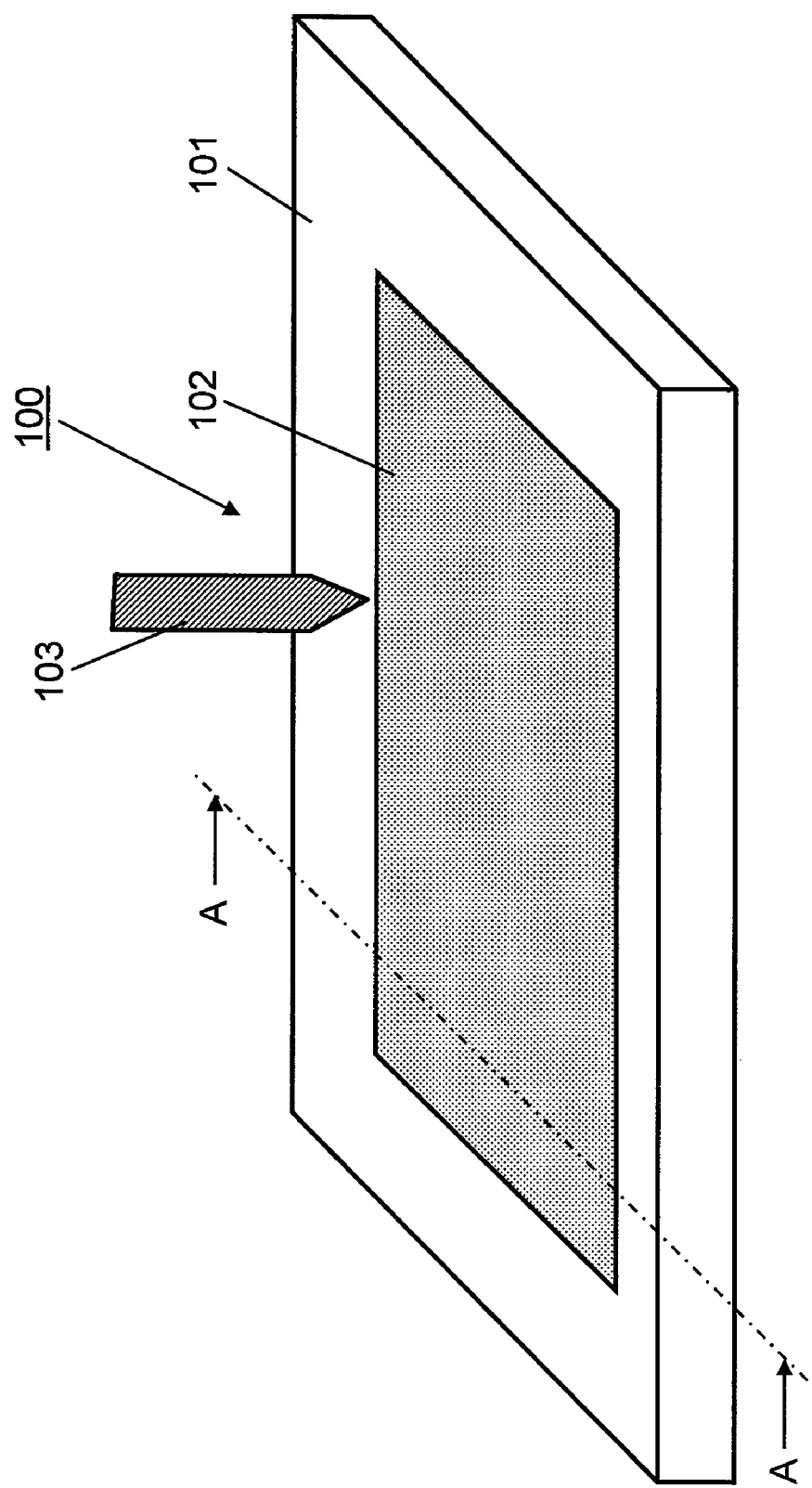
FIG. 1 is a perspective view of the display device in accordance with a first exemplary embodiment of the present invention.
Figure 2:
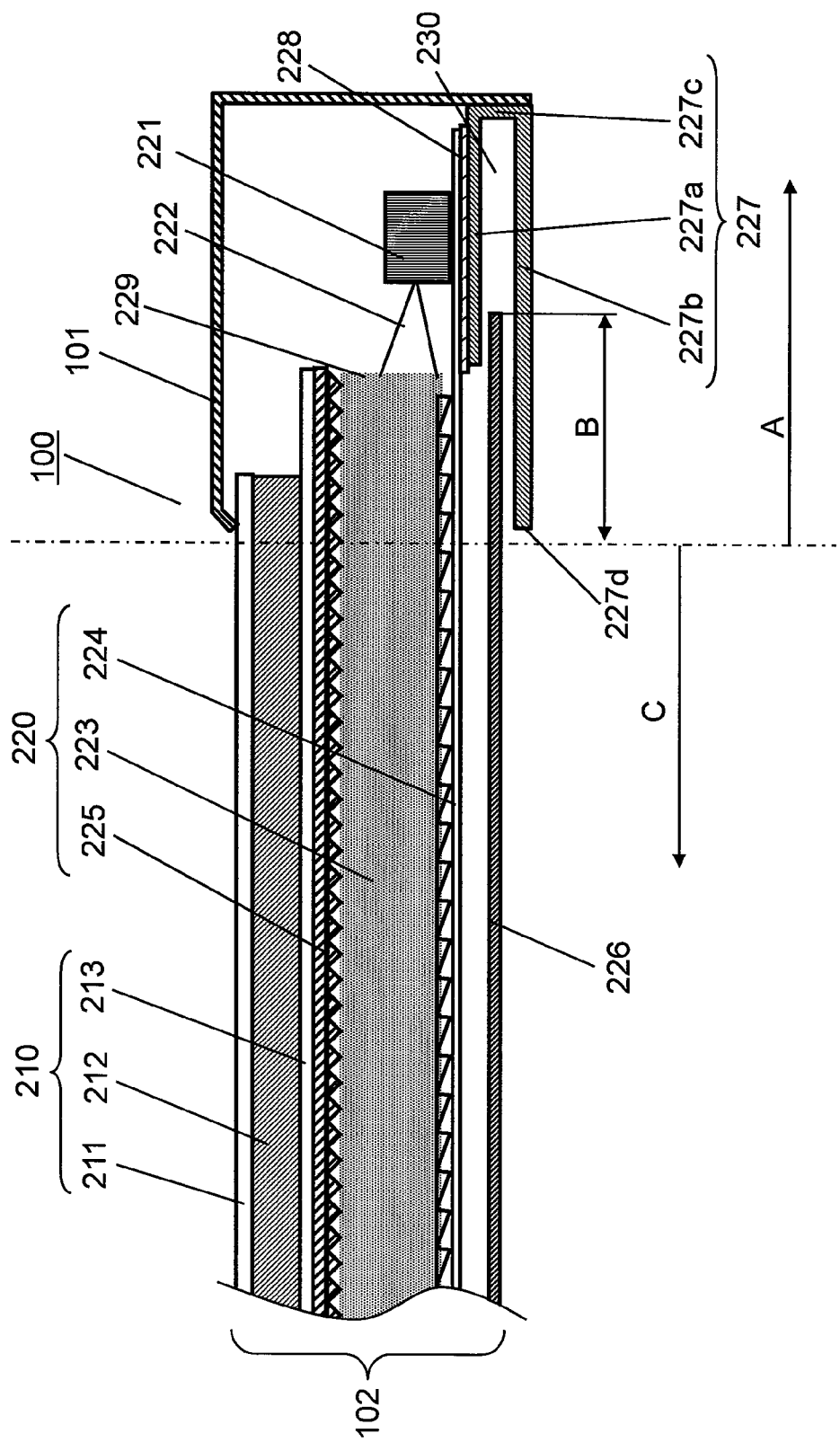
FIG. 2 is a partly shown sectional view, taken along line A-A, of the display device of FIG. 1.

FIG. 1 is a perspective view of the display device in accordance with the first exemplary embodiment of the present invention. FIG. 2 is a partly shown sectional view, taken along line A-A, of the display device of FIG. 1. As is shown in FIG. 1, the periphery of display device 100 is covered with resin-made housing 101. LCD panel 102 is disposed inside display device 100 and housing 101. Electromagnetic digitizer 226 is disposed on the back surface of LCD panel 102. When a user operates electromagnetic stylus 103 close to the screen of LCD panel, digitizer 226 detects the position data required for data processing operation. Although LCD panel 102 is sandwiched between a front glass substrate and a back glass substrate, the two substrates are omitted in the drawings.

LCD panel 102, as is shown in FIG. 2, is formed of LCD section 210 and backlight source section 220. LCD section 210 further contains outgoing-light polarizing plate 211, LCD body 212, and incoming-light polarizing plate 213. Backlight source section 220 further contains LED 221 as a light source, light-guide plate 223 for leading white light 222 emitted from LED 221, reflection sheet 224, and prism sheet 225. LED 221 is disposed at an end of one shorter-side of display device 100. Reflection sheet 224 is disposed on the back surface of light-guide plate 223. On the other hand, prism sheet 225 is disposed on the front surface of light-guide plate 223.

White light 222 from LED 221 goes toward end section 229 of light-guide plate 223. White light 222 is led by light-guide plate 223 and uniformly reflected on the surface of reflection sheet 224 that is disposed on the back surface of light-guide plate 223. After that, prism sheet 225 allows the reflected light to travel nearly vertical to LCD body 212.

In LCD section 210, the incoming light is polarized by incoming-light polarizing plate 213. After that, outgoing-light polarizing plate 211 partly limits the light according to a twist angle of liquid crystal elements arranged in LCD body 212. In this way, the amount of light provided on the screen is controlled, whereby gradation of each pixel is determined.

On the rear side of reflection sheet 224, i.e., on the rear surface of LCD panel 102, electromagnetic digitizer 226 is disposed close to reflection sheet 224. Digitizer 226 receives position data from electromagnetic stylus 103 shown in FIG. 1.

Here will be given an in-detail description on end section A, at which LED 221 is disposed, of display device 100. According to the structure of the embodiment, as is shown in FIG. 2, LED 221 is mounted on the surface of reflection sheet 224 that extends beyond light-guide plate 223 into end section A. That is, extended reflection sheet 224 itself serves as a substrate having a surface parallel to reflection sheet 224. On the other hand, digitizer 226 has end section B that extends toward end section A. First heat-dissipation plate 227, which is made of non-magnetic material and formed into a U-shape, is disposed adjacent to end section B; specifically, end section B is inserted through opening 230 of heat-dissipation plate 227 and sandwiched between extending sections 227a and 227b, which are to be flat parts of the U-shape. The top surface of extending section 227a is bonded to reflection sheet 224 via thermally conductive double-faced adhesive tape 228.

That is, LED 221 as the light source is disposed on extending section 227a of U-shaped first heat-dissipation plate 227 via extended reflection sheet 224.

Digitizer 226 does not work correctly in its end section. Considering this, display device 100 of the embodiment is so structured that the valid operation area of digitizer 226 is located in valid display area C of LCD panel 102 and end section B is extended toward end section A of the display device.

Heat-dissipation plate 227 is formed of extending sections 227a and 227b, and back section 227c. In the structure above, extending section 227b is formed longer than extending section 227a that is bonded to reflection sheet 224, and at the same time, tip section 227d of extending section 227b is located outside valid display area C of LCD panel 210.

According to the structure of the embodiment, valid display area C of the display device nearly equals in size to the display area of LCD panel 102 shown in FIG. 1. The end sections of LCD body 212 and light-guide plate 223, which are not included in valid display area C, are covered with housing 101 made of resin, aluminum alloy or the like.

According to display device 100 of the first exemplary embodiment, as described above, end section B of electromagnetic induction-type digitizer 226 is sandwiched between extending sections 227a and 227b of first heat-dissipation plate 227. At the same time, extending section 227a of heat-dissipation plate 227 has thermal contact, via reflection sheet 224 and thermally conductive double-faced adhesive tape 228, to LED 221. Besides, heat-dissipation plate 227 is disposed outside valid display area C of display device 100.

As described above, display device 100 of the embodiment has the structure in which a metal that can exhibit magnetic properties is disposed outside valid display area C. By virtue of the structure, digitizer 226 is protected from unwanted magnetic effect that can be caused by heat-dissipation plate 227, thereby receiving position data with accuracy from electromagnetic stylus 103 in the data input operation.

According to the structure above, heat generated from LED 221 is carried through reflection sheet 224, double-faced adhesive tape 228 to all over heat-dissipation plate 227, and finally, the heat goes out of the back side of display device 100. The structure allows the heat to be effectively released from the back side of the device.

Besides, heat-dissipation plate 227 has a U-shape so as to have a larger area for heat-dissipation. To be specifically, extending section 227a disposed on the side of reflection sheet 224 differs, in length, from extending section 227b disposed on the rear side of digitizer 226. At the same time, extending section 227b has a length maximum within the bounds of not entering in valid display area C; on the other hand, extending section 227a has a length that does not reach light-guide plate 223. By virtue of the structure, the heat generated from LED 221 is carried to back section 227c and extending section 227b of heat-dissipation plate 227, rather than light-guide plate 223, and is released outside. As a result, the structure suppresses thermal deterioration of light-guide plate 223 and reflection sheet 224.

Aluminum and copper, which are non-magnetic materials with high thermal conductivity, are employed for heat-dissipation plate 227 as the first heat-dissipation plate. Stainless steel is a further preferable material. Using metallic material allows heat-dissipation plate 227 to be easily formed by molding, but it is not limited thereto. The heat-dissipation plate may be formed of carbon material with high thermal conductivity or resin material.

According to the structure described above, reflection sheet 224 extended toward end section A is bonded to extending section 227a of heat-dissipation plate 227. It is not necessarily to have the structure; an insulation material of resin is disposed in end section A for mounting LED 221 thereon, instead of extending refection sheet 224.

As is shown in the structure of display device 100 of the embodiment in FIG. 2, LED 221 is disposed on a lower position with respect to light-guide plate 223, that is, the central line of LED 221 runs lower than that of light-guide plate 223. The arrangement allows the light from LED 221 to go into the lower part in thickness of light-guide plate 223. That is, the height of LED 221 may be formed smaller than the thickness of light-guide plate 223. The structure allows the amount of light reflected on reflection sheet 224 to be greater than the amount of light that directly gets into prism sheet 225, providing the display device with excellent brightness with high uniformity.

According to display device 100 of the embodiment, as described above, the structure achieves effective heat-dissipation with no ill effect on the detection accuracy of digitizer 226. This allows LED 221 to have sufficiently large input-power, providing display device 100 with consistent high brightness.

Second Embodiment

Figure 3:
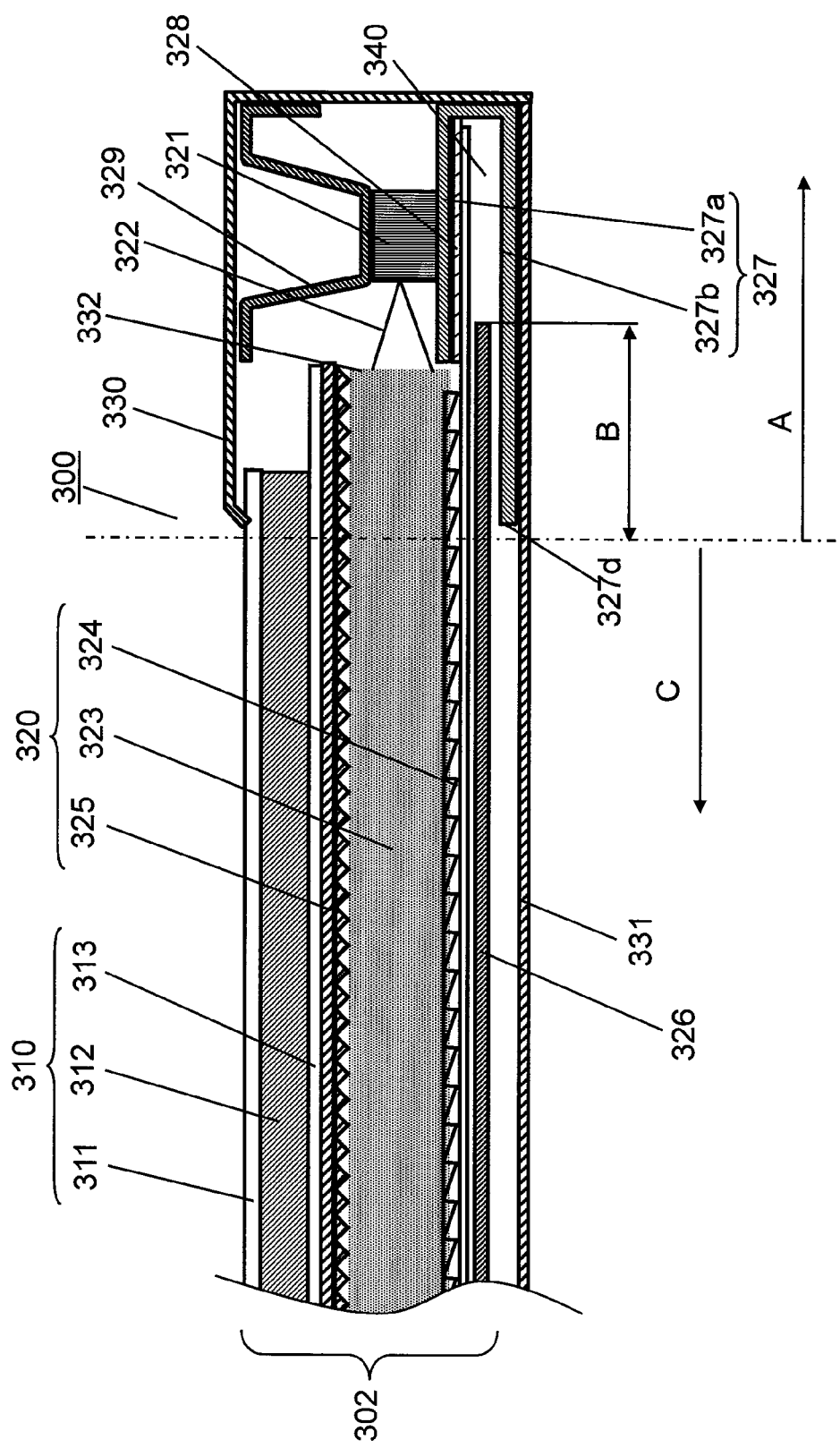
FIG. 3 is a partly shown sectional view of the display device in accordance with a second exemplary embodiment of the present invention.

FIG. 3 is a partly shown sectional view of the display device in accordance with the second exemplary embodiment of the present invention. The display device of the embodiment has a structure basically the same as that of display device 100 described in the first embodiment—with the exceptions of the structures of end section A and the housing.

As is shown in FIG. 3, LCD panel 302 of display device 300 is formed of LCD section 310 and backlight source section 320. LCD section 310 further contains outgoing-light polarizing plate 311, LCD body 312, and incoming-light polarizing plate 313. Backlight source section 320 further contains LED 321 as a light source, light-guide plate 323 for leading white light 322 emitted from LED 321, reflection sheet 324, and prism sheet 325. LED 321 is disposed at an end of one shorter-side of display device 300. Reflection sheet 324 is disposed on the back surface of light-guide plate 323. On the other hand, prism sheet 325 is disposed on the front surface of light-guide plate 323.

White light 322 from LED 321 goes toward end section 332 of light-guide plate 323. White light 322 is led by light-guide plate 323 and uniformly reflected on the surface of reflection sheet 324 that is disposed on the back surface of light-guide plate 323. After that, prism sheet 325 allows the reflected light to travel nearly vertical to LCD body 312.

In LCD section 310, the incoming light is polarized by incoming-light polarizing plate 313. After that, outgoing-light polarizing plate 311 partly limits the light according to a twist angle of liquid crystal elements arranged in LCD body 312. In this way, the amount of light provided on the screen is controlled, whereby gradation of each pixel is determined.

On the rear side of reflection sheet 324, i.e., on the back surface of LCD panel 302, electromagnetic digitizer 326 is disposed close to reflection sheet 324. Digitizer 326 receives position data from electromagnetic stylus 103 shown in FIG. 1.

Here will be given an in-detail description on end section A, at which LED 321 is disposed.

Like in the first embodiment, digitizer 326 of the second embodiment has end section B that extends toward end section A. Besides, first heat-dissipation plate 327, which is made of non-magnetic material and formed into a U-shape, is disposed adjacent to end section B; specifically, end section B is inserted through opening 340 of heat-dissipation plate 327 and sandwiched between extending sections 327a and 327b, which are flat parts of the U-shape. According to the embodiment, an extended part of reflection sheet 324 serves as the substrate on which LED 321 is mounted. Specifically, the upper surface of the extended part of reflection sheet 324 is bonded to the lower surface of extending section 327a via thermally conductive double-faced adhesive tape 328. LED 321 is disposed on the upper surface of extending section 327a of heat-dissipation plate 327. The upper surface of LED 321 is secured by fitting 329 that is fixed to housing 330.

As described above, end section B of digitizer 326 is located between extending sections 327a and 327b of heat-dissipation plate 327. In the structure above, extending section 327b is formed longer than extending section 327a bonded to reflection sheet 324; and at the same time, the length of extending section 327b is so determined that tip section 327d stays outside valid display area C of LCD panel 310. The display device of the embodiment has the structure in which a metal that can exhibit magnetic properties is disposed outside valid display area C. By virtue of the structure, digitizer 326 receives position data from electromagnetic stylus 103 with no ill effect caused by a distorted magnetic field, achieving a high degree of position-detecting accuracy.

According to display device 300 of the embodiment, LED 321 is mounted directly on extending section 327a of heat-dissipation plate 327. That is, the structure has no reflection sheet 324 between LED 321 and extending section 327a, allowing the heat generated from LED 321 to be directly and effectively carried to extending section 327a of heat-dissipation plate 327.

In addition, fitting 329 attached on LED 321 also promotes heat-dissipation from LED 321 through housing 330 to the outside.

FIG. 3 shows the display device of the second exemplary embodiment that has a structure where metallic sheet 331 is disposed along extending section 327b of heat-dissipation plate 327 on the rear side of digitizer 326. Metallic sheet 331 is made of stainless steel or the like and serves as a part of housing 330. The structure above carries heat of heat-dissipation plate 327 to metallic sheet 331 having a large area for heat dissipation, efficiently dissipating heat of LED 321.

Aluminum and copper, which are non-magnetic materials with high thermal conductivity, are employed for heat-dissipation plate 327 as the first heat-dissipation plate. Stainless steel is a further preferable material. Although using metallic material allows heat-dissipation plate 327 to be easily formed by molding, it is not limited thereto. The heat-dissipation plate may be formed of carbon material with high thermal conductivity or resin material.

As described above, display device 300 of the embodiment improves the position detecting accuracy of digitizer 326 and effectively dissipates the heat generated from LED 321 with the use of the heat-dissipation plate having a sufficiently large area, allowing LED 321 to have large input. That is, LED 321 with high brightness can be employed for the display device. By virtue of the structure, display device 300 of the embodiment provides consistently high brightness and interactive input operations between the device and the user.

Third Embodiment

Figure 4:
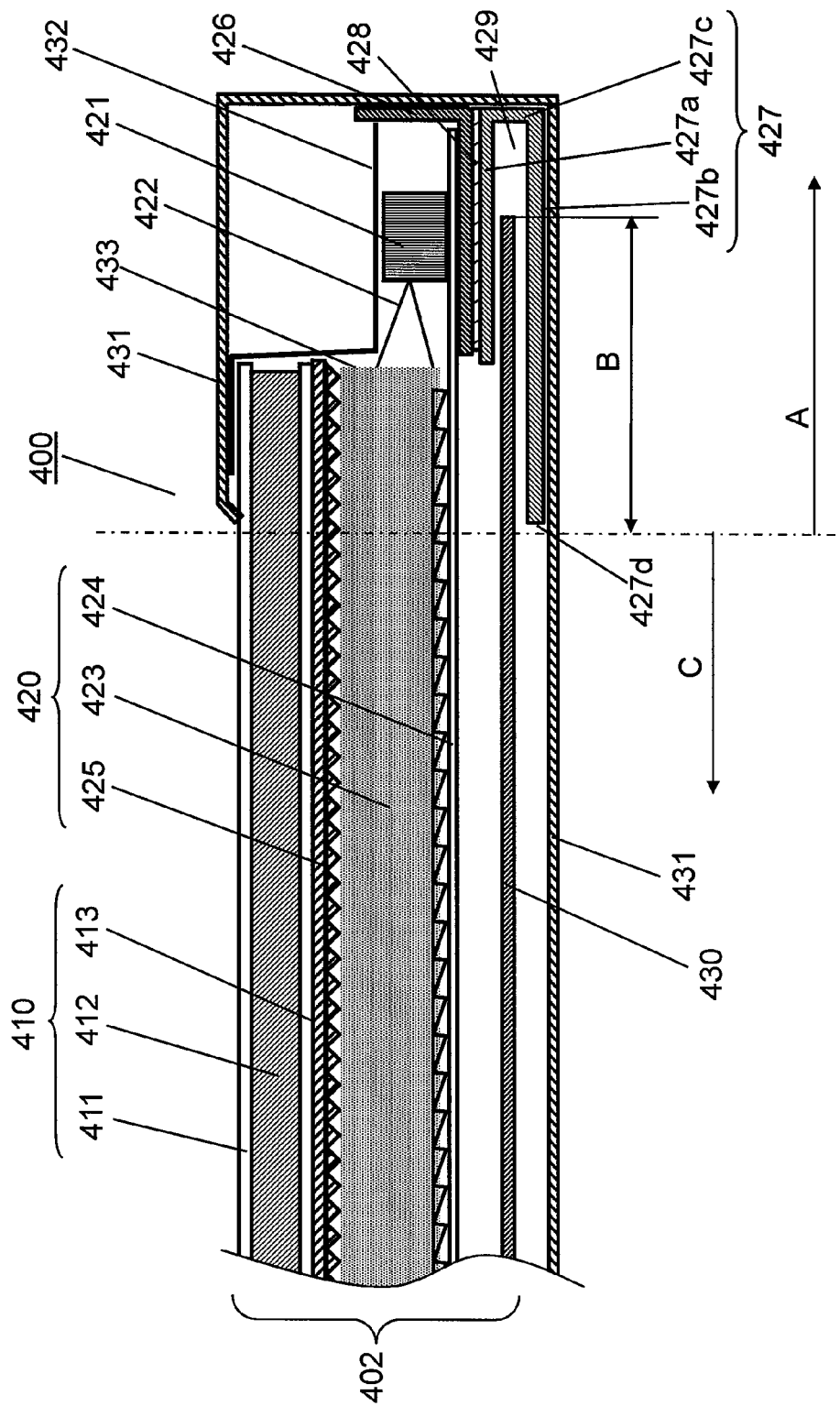
FIG. 4 is a partly shown sectional view of the display device in accordance with a third exemplary embodiment of the present invention.

FIG. 4 is a partly shown sectional view of display device 400 in accordance with the third exemplary embodiment of the present invention. Display device 400 of the embodiment has a structure basically the same as that of display device 300 described in the second embodiment—with the exception of the structure of end section A.

As is shown in FIG. 4, LCD panel 402 of display device 400 is formed of LCD section 410 and backlight source section 420. LCD section 410 further contains outgoing-light polarizing plate 411, LCD body 412, and incoming-light polarizing plate 413. Backlight source section 420 further contains LED 421 as a light source, light-guide plate 423 for leading white light 422 emitted from LED 421, reflection sheet 424, and prism sheet 425. LED 421 is disposed at an end of one shorter-side of display device 400. Reflection sheet 424 is disposed on the back surface of light-guide plate 423. On the other hand, prism sheet 425 is disposed on the front surface of light-guide plate 423.

White light 422 from LED 421 goes toward end section 433 of light-guide plate 423. White light 422 is led by light-guide plate 423 and uniformly reflected on the surface of reflection sheet 424 that is disposed on the back surface of light-guide plate 423. After that, prism sheet 425 allows the reflected light to travel nearly vertical to LCD body 412.

In LCD section 410, the incoming light is polarized by incoming-light polarizing plate 413. After that, outgoing-light polarizing plate 411 partly limits the light according to a twist angle of liquid crystal elements arranged in LCD body 412. In this way, the amount of light provided on the screen is controlled, whereby gradation of each pixel is determined.

LED 421 is disposed on a surface of a part extended from reflection sheet 424. Besides, heat-dissipation plate 426 as a second heat-dissipation plate is fixed on the rear side of the part having LED 421 thereon of reflection sheet 424. In addition to heat-dissipation plate 427 as a first heat-dissipation plate, the structure of the embodiment further contains heat-dissipation plates 426 as a second heat-dissipation plate. Heat-dissipation plate 426 is made of non-magnetic metal, such as aluminum and stainless steel, and is formed into an L-shape so as to increase the area for heat dissipation. Heat-dissipation plate 427 is also made of non-magnetic metal, such as aluminum and stainless steel, and is formed into a U-shape. Heat-dissipation plate 427 is bonded to one plane of the L-shape of heat-dissipation plate 426. That is, end section B of digitizer 430 is located between extending sections 427a and 427b, which are to be flat parts of heat-dissipation plate 427.

In the structure above, like in the structures described in the first and the second embodiments, extending section 427b is formed longer than extending section 427a bonded to reflection sheet 424; and at the same time, the length of extending section 427b is so determined that tip section 427d stays outside valid display area C of LCD panel 410. Digitizer 430 has end section B that extends toward end section A. First heat-dissipation plate 427, which is made of non-magnetic material and formed into a U-shape, is disposed adjacent to end section B; specifically, end section B is inserted through opening 429 of heat-dissipation plate 427 and sandwiched between extending sections 427a and 427b of the U-shape. The display device of the embodiment has the structure in which a metal that can exhibit magnetic properties is disposed outside valid display area C. The structure above eliminates an unwanted magnetic effect that can be caused by heat-dissipation plates 426 and 427 in data-input operations between electromagnetic stylus 103 and digitizer 430, allowing digitizer 430 to receive position data with high accuracy.

Heat-dissipation plate 426, 427 and LED 421 are accommodated in housing 431 so as not to be exposed to the outside. The upper surface of LED 421 is secured by fitting 432 that is fixed to housing 431.

The structure of the embodiment further has L-shaped heat-dissipation plate 426 as a second heat-dissipation plate. This encourages heat dissipation from LED 421, and accordingly, increases output of LED 421. When a radiation fin is disposed on another plane of L-shaped heat-dissipation plate 426 (i.e., the plane having no LED 421 thereon) and on back section 427c of heat-dissipation plate 427, the heat-dissipation effect will be further increased.

Although using metallic material, such as copper, aluminum, and stainless steel, allows heat-dissipation plates 226 and 227 to be easily formed by molding, it is not limited thereto. The heat-dissipation plate may be formed of carbon material with high thermal conductivity or resin material.

As described above, the display device of the embodiment improves the position detecting accuracy of digitizer 430 and effectively dissipates the heat generated from LED 421 with the use of a sufficiently large area of the heat-dissipation plates, allowing LED 421 to have large input. This provides a display device with a long life and high brightness.

Although the embodiments of the present invention introduce a structure where an LED is employed for a backlight source, it is not limited thereto. When other point-light sources are used, the device effectively dissipates the heat from the light source and accurately processes data using a digitizer.

According to the structures described in the embodiments, LED 221 as the light source is disposed on the upper surface of extending section 227a of U-shaped heat-dissipation plate 227 in the first exemplary embodiment; further, LED 321 is disposed on the upper surface of extending section 327a in the second exemplary embodiment; still further, LED 421 is disposed on the side of the upper surface of extending section 427a in the third exemplary embodiment. However, each LED as the light source described above is not necessarily disposed on the aforementioned sections. For example, in FIG. 2 of the second exemplary embodiment, the LED may be disposed on the lower surface of extending section 227a or on back section 227c of the U-shape.

What is claimed is:

1. A display device comprising:
    a liquid crystal display (LCD) panel;
    a digitizer disposed on a back surface of the LCD panel;
    a first heat-dissipation plate disposed on at least one end of a periphery of the LCD panel; and
    a light source mounted on a surface of the first heat-dissipation plate,
    wherein the first heat-dissipation plate is made of a non-magnetic material,
        the first heat-dissipation plate is formed into a U-shaped first heat-dissipation plate,
        the first heat-dissipation plate includes an opening toward a side of the LCD panel, a first extending section existing in front of the digitizer, a second extending section existing behind the digitizer and a back section existing above the an edge of the digitizer, and
        an end section of the digitizer is inserted through the opening of the first heat-dissipation plate.

2. The display device of claim 1,
    wherein the light source is placed at one outer surface of a pair of flat parts, which faces each other, of the U-shaped first heat-dissipation plate.

3. The display device of claim 1,
    wherein the LCD panel is formed of a backlight source section and an LCD body stacked on the backlight source section, the backlight source section has a multilayered structure of a reflection sheet, a light-guide plate, and a prism sheet, and an LED for emitting light toward an end section of the light-guide plate is disposed on a substrate having a surface parallel to the reflection sheet.

4. The display device of claim 3,
    wherein a lower surface of the substrate having the LED thereon is bonded to the first heat-dissipation plate via a thermally conductive adhesive.

5. The display device of claim 3,
    wherein the first heat-dissipation plate is disposed on an upper surface of the substrate via a thermally conductive adhesive, and the LED is mounted on the first heat-dissipation plate.

6. The display device of claim 3,
    wherein an L-shaped second heat-dissipation plate is disposed on a lower surface of the substrate having the LED thereon, and the second heat-dissipation plate is bonded to the first heat-dissipation plate via a thermally conductive adhesive.

7. The display device of claim 1,
    wherein the first heat-dissipation plate, which covers the end section of the digitizer, is located outside a valid display area of the LCD panel.

8. The display device of claim 1,
wherein the first extending section is bounded to a reflection sheet, and
    the second extending section is formed longer than the first extending section.

* * * * *

UNITED STATES PATENT AND TRADEMARK OFFICE
CERTIFICATE OF CORRECTION

PATENT NO.       : 8,164,583 B2
APPLICATION NO.  : 12/401652
DATED            : April 24, 2012
INVENTOR(S)      : Atsushi Hatakeyama It is certified that error appears in the above-identified patent and that said Letters Patent is hereby corrected as shown below:

Column 8
At line 25, between "above" and "an", please delete "the".

Signed and Sealed this
Third Day of July, 2012

David J. Kappos
*Director of the United States Patent and Trademark Office*